United States Patent
Yang et al.

(10) Patent No.: US 9,832,581 B1
(45) Date of Patent: Nov. 28, 2017

(54) ELECTRONIC DEVICE CAPABLE OF AUTOMATICALLY ADJUSTING AN OUTPUT VOLUME

(71) Applicant: Unlimiter MFA Co., Ltd., Eden Island (SC)

(72) Inventors: Kuo-Ping Yang, Taipei (TW); Neo Bob Chih-Yung Young, Taipei (TW); Kuan-Li Chao, Taipei (TW); Ming-Ren Ma, Taipei (TW); Chih-Long Chang, Taipei (TW)

(73) Assignee: UNLIMITER MFA CO., LTD., Eden Island (SC)

( * ) Notice: Subject to any disclaimer, the term of this patent is extended or adjusted under 35 U.S.C. 154(b) by 0 days.

(21) Appl. No.: 15/343,281

(22) Filed: Nov. 4, 2016

(30) Foreign Application Priority Data

Aug. 16, 2016 (TW) .............................. 105212402 A

(51) Int. Cl.
*H04R 29/00* (2006.01)
*G06F 3/16* (2006.01)

(52) U.S. Cl.
CPC ........... *H04R 29/001* (2013.01); *G06F 3/165* (2013.01); *H04R 2430/01* (2013.01)

(58) Field of Classification Search
CPC ..................................................... H04R 29/00
See application file for complete search history.

(56) References Cited

U.S. PATENT DOCUMENTS

| | | | | |
|---|---|---|---|---|
| 2005/0282590 A1* | 12/2005 | Haparnas | ............ | H04M 19/044 455/570 |
| 2008/0025525 A1* | 1/2008 | Tsai | ..................... | H03G 3/3005 381/74 |
| 2010/0005953 A1* | 1/2010 | Kemmochi | ............. | H03G 3/32 84/633 |
| 2010/0027807 A1* | 2/2010 | Jeon | ....................... | H03G 7/002 381/74 |
| 2012/0264481 A1* | 10/2012 | Gu | ....................... | H04M 1/6016 455/550.1 |
| 2014/0185834 A1* | 7/2014 | Fromel | ................. | G06F 3/0488 381/109 |
| 2014/0254832 A1* | 9/2014 | Qian | .................... | H03G 3/3005 381/107 |
| 2016/0065155 A1* | 3/2016 | Bharj | ....................... | H03G 1/02 381/105 |
| 2017/0117003 A1* | 4/2017 | Takasu | .................. | G10L 21/034 |

* cited by examiner

*Primary Examiner* — Olisa Anwah
(74) *Attorney, Agent, or Firm* — Bacon & Thomas, PLLC

(57) ABSTRACT

An electronic device includes an audio player and a processing unit. The processing unit includes a detection module, a timer module, and a control module. The detection module is used to detect an output volume produced currently when the audio player produces sound and to determine whether the output volume conforms to a volume control standard. The timer module is signally connected with the detection module and used to calculate the cumulative time during which the output volume produced by the audio player conforms to the volume control standard when the output volume conforms to the volume control standard and to determine whether the cumulative time equals the control time. The control module is signally connected with the timer module and used to control the audio player to decrease the volume of an output sound or to stop outputting sound when the cumulative time equals the control time.

14 Claims, 1 Drawing Sheet

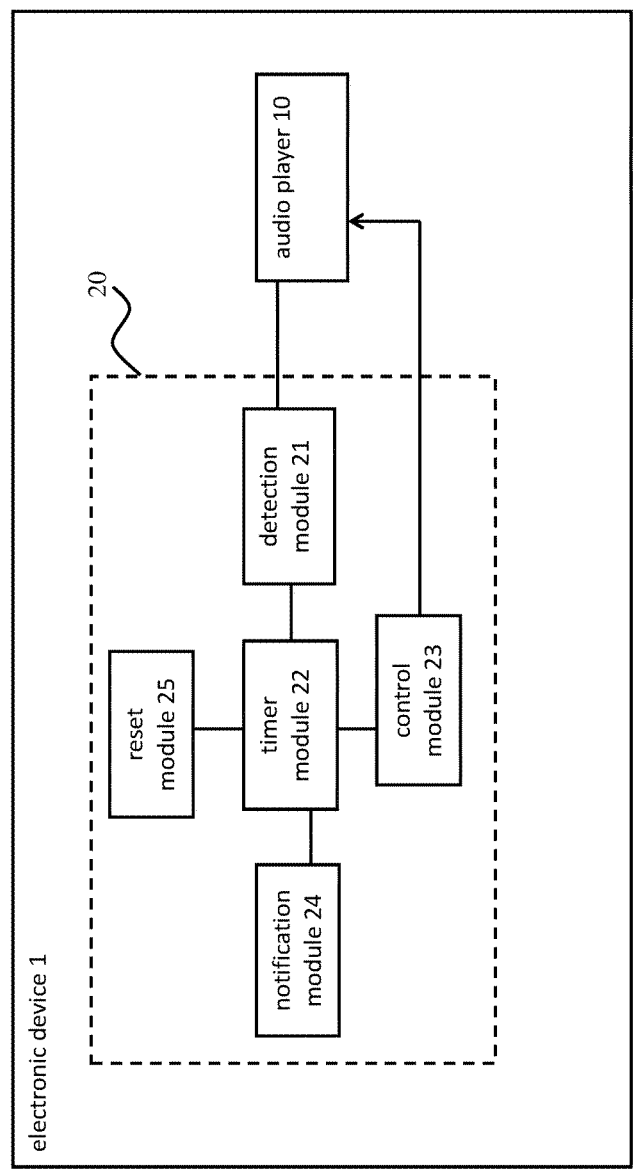

ELECTRONIC DEVICE CAPABLE OF AUTOMATICALLY ADJUSTING AN OUTPUT VOLUME

BACKGROUND OF THE INVENTION

1. Field of the Invention

The present invention relates to an electronic device capable of producing sound, particularly to an electronic device capable of automatically adjusting an output volume.

2. Description of the Related Art

With the popularity of handheld electronic products, people spend more time using electronic products, especially using them to listen to music or watch videos. However, prolonged exposure to high volume environments is likely to cause damage to the user's hearing.

According to the World Health Organization, continuous exposure to 85 dB for 8 hours or to 100 dB for 15 minutes may cause temporary hearing loss or tinnitus. In other words, for a greater volume of the sound, the contact time should be less. A high output sound volume or a long exposure time to a high volume environment may cause permanent damage to the auditory cells of the ear.

Accordingly, there is a need to consider hearing protection measures that can control the duration for which different output volumes of sound are played through an electronic device.

SUMMARY OF THE INVENTION

It is a major objective of the present invention to provide an electronic device capable of automatically adjusting an output volume.

To achieve the objective described above, the electronic device of the present invention includes an audio player and a processing unit. The audio player is used for outputting sound. The processing unit is electrically connected to the audio player and includes a detection module, a timer module, and a control module. The detection module is used for detecting an output volume currently produced by the audio player outputting sound. The timer module is signally connected to the detection module and used for determining whether the output volume produced by the audio player conforms to a volume control standard. When the output volume conforms to the volume control standard, the timer module calculates a cumulative time of the audio player producing the output volume that conforms to the volume control standard. The control module is signally connected to the timer module and used for determining whether the cumulative time of the audio player producing an output volume conforming to the volume control standard equals a control time. When it is determined that the cumulative time equals the control time, the control module controls the audio player to decrease the output volume of the output sound or to stop outputting sound.

According to an embodiment of the present invention, the volume control standard includes a plurality of volume values within a numerical interval.

According to an embodiment of the present invention, when it is determined that the output volume produced by the audio player conforms to one of the plurality of volume values, the cumulative time calculated and obtained by the timer module is the cumulative time of the audio player producing sound at the output volume that conforms to the volume value.

According to an embodiment of the present invention, the corresponding control times to be determined for cumulative times of the output volumes that conform to each of the volume values are different; when the volume value determined is greater, the corresponding control time determined is shorter.

According to an embodiment of the present invention, a starting value of the range of the volume values is X, where $40 \leq X \leq 90$. The control times are calculated as follows:

$$T = 8*60*60/2^{[((N-X)/3)]},$$

where T is the control time and N is the output volume produced by the audio player.

According to an embodiment of the present invention, when it is determined that the total sum of the proportions of each cumulative time of the audio player producing an output volume that conforms to each of the volume values to each corresponding control times equals 80%, the control module is further used for controlling the audio player to decrease the output volume by $\alpha$ (dB) when producing sound, where $1 \leq \alpha \leq 10$.

According to an embodiment of the present invention, when it is determined that the total sum of the proportions of the cumulative time of the audio player producing an output volume that conforms to each of the volume values to each of the corresponding control times equals 90%, the control module is further used to control the audio player to decrease the output volume by $2\alpha$ (dB) when producing sound, where $1 \leq \alpha \leq 10$.

According to an embodiment of the present invention, when it is determined that the total sum of the proportions of each cumulative time of the audio player producing an output volume that conforms to each of the volume values to each corresponding control time equals 100%, the control module is further used for controlling the audio player to stop outputting sound.

According to an embodiment of the present invention, the processing unit further includes a reset module, which is signally connected to the timer module and used for receiving a reset command and for resetting the cumulative times of output volumes conforming to each of the volume values to zero according to the reset command.

According to an embodiment of the present invention, the processing unit further includes a notification module signally connected to the timer module. The notification module is used for outputting a warning message when the total sum of the proportions of each cumulative time of the audio player producing an output volume that conforms to each of the volume values to each corresponding control time equals 80%.

According to an embodiment of the present invention, the processing unit further includes a notification module signally connected to the timer module. The notification module is used for outputting a warning message when the total sum of the proportions of each cumulative time of the audio player producing an output volume that conforms to each of the volume values to each corresponding control time equals 90%.

According to an embodiment of the present invention, the control module is further used for controlling the audio player to decrease the output volume by $\alpha$ (dB) of the output sound, where $1 \leq \alpha \leq 10$, when it is determined that the cumulative time of the audio player producing an output volume that conforms to the volume control standard exceeds 80% of the control time.

According to an embodiment of the present invention, when it is determined that the cumulative time of the audio player producing the output volume that conforms to the volume control standard exceeds 90% of the control time, the control module is further used for controlling the audio player to decrease the output volume by 2α (dB) of the output sound, where $1 \leq \alpha \leq 10$.

According to an embodiment of the present invention, when it is determined that the cumulative time of the audio player producing an output volume that conforms to the volume control standard equals the control time, the control module is used for controlling the audio player to stop outputting sound.

According to an embodiment of the present invention, the processing unit further includes a reset module signally connected to the timer module. The reset module is used for receiving a reset command and for resetting the cumulative time of the output volume conforming to the volume control standard to zero according to the reset command.

BRIEF DESCRIPTION OF THE DRAWINGS

FIG. 1 is an architecture diagram of an electronic device capable of automatically adjusting an output volume according to the present invention.

DETAILED DESCRIPTION OF THE PREFERRED EMBODIMENT

Hereafter, the technical content of the present invention will be better understood with reference to preferred embodiments.

Hereafter, please refer to FIG. 1, which is an architecture diagram of an electronic device capable of automatically adjusting an output volume according to the present invention.

As shown in FIG. 1, in an embodiment of the present invention, an electronic device 1 capable of automatically adjusting an output volume of the present invention includes an audio player 10 and a processing unit 20. In a specific embodiment of the present invention, the electronic device 1 is a smart phone, but the present invention is not limited thereto.

In an embodiment of the present invention, the audio player 10, for example, may be a speaker used for outputting sound.

The processing unit 20, such as a central processing unit (CPU), is electrically connected to the audio player 10. In an embodiment of the present invention, the processing unit 20 includes a detection module 21, a timer module 22, a control module 23, a notification module 24 and a reset module 25. It should be noted that the above respective modules may not only be configured as hardware devices, software programs, firmware, or combinations thereof, but configured by circuit loop or other suitable types. Also, each of the modules can be configured individually or in the form of combination. In a preferred embodiment, the modules are all software programs stored in the memory (not shown) and executed by the processing unit 20 to achieve functions of the present invention. Additionally, the preferred embodiment of the present invention described here is only illustrative. To avoid redundancy, not all possible combinations of changes are documented in detail. However, it shall be understood by those skilled in the art that each of the modules or elements described above may not be necessary. For the implementation of the present invention, the present invention may also contain other detailed, conventional modules or elements. Each module or component is likely to be omitted or modified depending on the design requirements. Other modules or elements may not necessarily exist between any two of the modules.

In an embodiment of the present invention, the detection module 21 is signally connected to the audio player 10. The detection module 21 can detect and determine an output volume currently produced by the audio player 10 by capturing audio signals.

In an embodiment of the present invention, the timer module 22 is signally connected to the detection module 21. When the detection module 21 detects that the audio player 10 is outputting sound, the detection module 21 will notify the timer module 22 of the output volume currently produced by the audio player 10. After receiving the notification from the detection module 21, the timer module 22 determines whether the output volume produced by the audio player 10 conforms to a volume control standard. When it is determined that the output volume produced by the audio player 10 conforms to the volume control standard, the timer module 22 will calculate the cumulative time of the audio player 10 outputting sound at an output volume that conforms to the volume control standard.

In the embodiment of the present invention, the volume control standard includes a plurality of volume values within a numerical interval from 85 to 100, where the unit is dB. The volume values are consecutive integers whose difference is 1, but the numerical interval is not limited thereto. Accordingly, in the embodiment of the present invention, once the output volume produced by the audio player 10 conforms to one of the plurality of volume values, the timer module 22 calculates cumulative time of the audio player 10 outputting sound at an output volume that conforms to the volume values. For example, assume that the detection module 21 has detected that the output volume produced by the audio player 10 is 91 dB; after receiving a notification from the detection module 21 that the output volume is 91 dB, the timer module 22 will calculate the cumulative time of the audio player 10 outputting sound at an output volume of 91 dB.

It should be noted here that the volume control standard of the present invention is not limited to that described above. In other embodiments, a single value can be used as the volume control standard. For example, an output volume greater than 85 dB may be used as the control limit. For calculation of the cumulative time, the total time of producing the output volume that conforms to the volume control standard can be consolidated, e.g., the total time of producing the output volume that is greater than 85 dB (including time of producing output volumes of 90, 95 or 100 dB), or the total time of producing output volumes that range from 85 dB to 100 dB can be consolidated.

To discourage users from reducing their listening time so as to listen to the output sound at higher output volumes, in the embodiment of the present invention, the control time standard set for sounds with volumes that conform to different volume values varies. In other words, for determining whether a cumulative time for sounds with volumes that conform to different volume values has equaled the standard, the correspondingly determined control times may vary from one another. When the volume value is greater, the corresponding control time determined is shorter. In a specific embodiment, the control time can be calculated and obtained by the following formula, $$T = 8*60*60/2^{((N-X)/3)} \text{ (Unit: sec)}$$

where X is the starting value of the numerical interval of the volume control standard, wherein 40≤X≤90; T is the control time; and N is the output volume produced by the audio player 10.

Taking the aforementioned numerical interval as example, the starting value X is 85. According to the above formula, the control times for different output volume values can be calculated as shown in the table below:

| Volume Value | Control Time (Unit: sec) |
| --- | --- |
| 85 | 28,800 |
| 86 | 22,860 |
| 87 | 18,144 |
| 88 | 14,400 |
| 89 | 11,412 |
| 90 | 9,072 |
| 91 | 7,200 |
| 92 | 5,724 |
| 93 | 4,536 |
| 94 | 3,600 |
| 95 | 2,844 |
| 96 | 2,268 |
| 97 | 1,800 |
| 98 | 1,440 |
| 99 | 1,116 |
| 100 | 900 |

In an embodiment of the present invention, the control module 23 is used for determining whether the total sum of the proportions of each cumulative time of the audio player producing an output volume that conforms to each of the volume values to each corresponding control time equals 80%; if yes, the control module 23 controls the audio player 10 to decrease the output volume by α (dB) of the output sound, where α is equal to 5, but the present invention is not limited thereto. Here, a may be greater than or equal to 1 and less than or equal to 10. For example, as shown in the table disclosed above, assume that the cumulative time of outputting an output volume of 91 dB has equaled 5,760 seconds (7,200*80%=5,760; i.e., the cumulative time of playing the 91 dB sound has equaled 80% of the determined corresponding control time). At this time, the control module 23 controls the audio player 10 to reduce the output volume by 5 dB during the following sound playing. Also, assuming that the cumulative time of the audio player 10 outputting sound at 91 dB is only 4,320 seconds and the audio player 10 has also played sound at 100 dB for 180 seconds; in this case, the total sum of the proportions of cumulative time of outputting sound at 91 dB to the determined corresponding control time (4,320/7,200*%=60%) and the proportion of the cumulative time of outputting sound at 100 dB to the determined corresponding control time (180/900*%=20%) equals 80%, so the control module 23 will also control the audio player 10 to reduce the output volume by 5 dB during the following sound playing.

In an embodiment of the present invention, the control module 23 is also used for determining whether the total sum of the proportions of each cumulative time of the audio player producing an output volume that conforms to each of the volume values to each corresponding control time equals 90%; if yes, the control module 23 will control the audio player 10 to reduce the output volume by 2α (dB). Similarly, as shown in the table disclosed above, for example, assume that the cumulative time of the audio player 10 outputting sound at 91 dB is 6,480 seconds (7,200*90%=6,480); at this time, the control module 23 will control the audio player 10 to reduce the output volume by 10 dB (if α=5) during the following sound playing. Also, assume that the cumulative time of the audio player 10 outputting sound at 91 dB is only 4,320 seconds and that the audio player 10 has also played sound at 85 dB for 2,880 seconds and at 88 dB for 2,880 seconds; in this case, the total sum of the proportions of the cumulative time of outputting sound at 91 dB to the determined corresponding control time (4,320/7,200*%=60%), the proportion of the cumulative time of outputting sound at 85 dB to the determined corresponding control time (2,880/28,800*%=10%), and the proportion of the cumulative time of outputting sound at 88 dB to the determined corresponding control time (2,880/14,400*%=20%) equal 90%, so the control module 23 will also control the audio player 10 to reduce the output volume by 10 dB.

In an embodiment of the present invention, the control module 23 is further used for controlling the audio player 10 to stop outputting sound when it has determined that the total sum of the proportions of each cumulative time of the audio player 10 producing volume that conforms to each of the volume values to each corresponding control equals 100%. As shown in the table disclosed above, for example, assume that the audio player 10 has produced sound at 94 dB for 3,600 seconds; at this time, the control module 23 controls the audio player 10 to stop outputting sound. Also, assume that the cumulative time of the audio player 10 producing sound at 94 dB is 1,800 seconds, but it does not equal the corresponding control time. However, since the cumulative time of the audio player 10 outputting sound at 88 dB equals 7,200 seconds, then when the total sum of the proportions of the cumulative time of the audio player 10 outputting sound at 94 dB to the correspondingly determined control time (1,800/3,600*%=50%) and the proportion of the cumulative time of the audio player 10 outputting sound at 88 dB to the correspondingly determined control time (7,200/14,400*%=50%) equal 100%, the control module 23 will also control the audio player 10 to stop outputting sound. For the examples disclosed above, regardless of whether the cumulative time of the output volumes conforming to specific volume values equal correspondingly determined control times (or 80% or 90% of the control time), or the total sum of the proportions of the cumulative time of output volume that conforms to each of the volume values to the correspondingly determined control time and proportion of the cumulative time of output volume that conforms to specific volume values other than the volume values described above to the correspondingly determined control time equal 100% (or 80% or 90%), the control module 23 will perform the corresponding control.

In an embodiment of the present invention, the notification module 24 may be a buzzer, an LED module or a command prompt program. The notification module 24 is signally connected with the timer module 22. When the timer module 22 has determined that the total sum of the proportions of the cumulative time of the audio player outputting a volume that conforms to the each of volume values to the correspondingly determined control time equals 80% and/or 90%, it informs the notification module 24 to output a warning message to alert users. The warning message described here may be conveyed by sound, by flashing lights, or by text messages displayed on the display (not shown) of the electronic device 1, but the present invention is not limited to a particular manner.

In an embodiment of the present invention, the reset module 25 is signally connected with the timer module 22. The reset module 25 can be used to receive a reset command input by a user and to reset the cumulative time including the output volume conforming to each of volume values to zero after receiving the reset command. In an embodiment, a physical button may be provided on the electronic device 1, or a virtual button may be displayed on the display of the electronic device 1, for users to enter a reset command. When a user sees a warning message or the electronic device 1 has been forced to stop outputting sound, but the user still wants to use the electronic device 1 to play sound, he/she can enter the reset command to reset the cumulative time conforming to each of the volume values to zero. For example, information about the cumulative time of the audio player 10 producing sound at 85 dB for 36,000 seconds or producing sound at 90 dB for 10,000 seconds will be reset to 0 seconds after the reset command is entered.

As described above, the electronic device 1 disclosed in the present invention can control the playback time during which the audio player 10 produces different volumes of sound and control the audio player 10 to decrease the output volume of the output sound or to stop outputting sound when the output volume of the audio player 10 equals a preset volume control standard. By providing real-time protection of the hearing of the user, it may reduce or prevent hearing damage due to prolonged exposure to high volume environments.

As described above, the objective, means, and efficiency of the present invention are all different from conventional characteristics in the prior art. It will be appreciated if the committee can review and grant a patent to benefit society. However, it should be noted that the described embodiments are for illustrative and exemplary purposes only, and that various changes and modifications may be made to the described embodiments without departing from the scope of the invention as disposed by the appended claims.

What is claimed is:

1. An electronic device capable of automatically adjusting an output volume, comprising:
    an audio player, used for outputting sound; and
    a processing unit, electrically connected to the audio player, comprising:
    a detection module, used for detecting an output volume currently output by the audio player producing sound;
    a timer module, signally connected to the detection module, for determining whether the output volume conforms to a volume control standard and calculating a cumulative time of the audio player producing an output volume conforming to the volume control standard when it is determined that the output volume conforms to the volume control standard; and
    a control module, signally connected to the timer module, for determining whether the cumulative time equals a control time and for controlling the audio player to decrease the output volume of the output sound or to stop outputting sound when it is determined that the cumulative time equals the control time,
    wherein the volume control standard includes a plurality of volume values within a numerical interval,
    wherein when it is determined that the output volume conforms to one of the plurality of volume values, the cumulative time calculated and obtained by the timer module is the cumulative time of the audio player producing the output volume that conforms to the volume value, wherein corresponding control times to be determined for cumulative times of the output volumes that conform to each of the volume values are different; when the volume value determined is greater, the corresponding control time determined is shorter, and wherein the starting value of the numerical interval is X, where $40 \leq X \leq 90$, and each of the control times is calculated as follows:

$$T=8*60*60/2^{((N-X)/3)},$$

where T is the control time and N is the output volume.

2. The electronic device as claimed in claim 1, wherein the control module is further used for controlling the audio player to decrease the output volume by $\alpha$ (dB) of the output sound, where $1 \leq \alpha \leq 10$, when it is determined that the total sum of the proportions of each cumulative time of the audio player producing an output volume that conforms to each of the volume values to each corresponding control time equals 80%.

3. The electronic device as claimed in claim 1, wherein the control module is further used for controlling the audio player to decrease the output volume by $2\alpha$ (dB) of the output sound, where $1 \leq \alpha \leq 10$, when it is determined that the total sum of the proportions of each cumulative time of the audio player producing an output volume that conforms to each of the volume values to each corresponding control time equals 90%.

4. The electronic device as claimed in claim 1, wherein the control module is further used for controlling the audio player to stop outputting sound when it has determined that the total sum of the proportions of each cumulative time of the audio player producing an output volume that conforms to each of the volume values to each corresponding control time equals 100%.

5. The electronic device as claimed in claim 1, wherein the processing unit further comprises a reset module, which is signally connected with the timer module and used for receiving a reset command and for resetting the cumulative times of output volumes that conform to each of the volume values to zero according to the reset command.

6. The electronic device as claimed in claim 2, wherein the processing unit further comprises a notification module which is signally connected with the timer module and used for outputting a warning message when the total sum of the proportions of each cumulative time of the audio player producing an output volume that conforms to each of the volume values to each corresponding control time equals 80%.

7. The electronic device as claimed in claim 3, wherein the processing unit further comprises a notification module which is signally connected with the timer module and used for outputting a warning message when the total sum of the proportions of each cumulative time of the audio player producing an output volume that conforms to each of the volume values to each corresponding control time equals 90%.

8. An electronic device capable of automatically adjusting an output volume, comprising:
    an audio player, used for outputting sound; and
    a processing unit, electrically connected to the audio player, comprising:
    a detection module, used for detecting an output volume currently output by the audio player producing sound;
    a timer module, signally connected to the detection module, for determining whether the output volume conforms to a volume control standard and calculating a cumulative time of the audio player producing an output volume conforming to the volume control standard when it is determined that the output volume conforms to the volume control standard; and
    a control module, signally connected to the timer module, for determining whether the cumulative time equals a control time and for controlling the audio player to decrease the output volume of the output sound or to stop outputting sound when it is determined that the cumulative time equals the control time, wherein the control module is further used for controlling the audio player to decrease the output volume by $\alpha$ (dB) of the output sound, where $1 \leq \alpha \leq 10$, when it is determined that the cumulative time of the audio player producing an output volume that conforms to the volume control standard exceeds 80% of the control time.

9. An electronic device capable of automatically adjusting an output volume, comprising:

an audio player, used for outputting sound; and a processing unit, electrically connected to the audio player, comprising:

a detection module, used for detecting an output volume currently output by the audio player producing sound;

a timer module, signally connected to the detection module, for determining whether the output volume conforms to a volume control standard and calculating a cumulative time of the audio player producing an output volume conforming to the volume control standard when it is determined that the output volume conforms to the volume control standard; and a control module, signally connected to the timer module, for determining whether the cumulative time equals a control time and for controlling the audio player to decrease the output volume of the output sound or to stop outputting sound when it is determined that the cumulative time equals the control time, wherein the control module is further used for controlling the audio player to decrease an output volume by $2\alpha$ (dB) of the output sound, where $1 \leq \alpha \leq 10$, when it is determined that the cumulative time of the audio player producing an output volume that conforms to the volume control standard exceeds 90% of the control time.

10. The electronic device as claimed in claim 1, wherein the control module is used for controlling the audio player to stop outputting sound when it is determined that the cumulative time of the audio player producing an output volume that conforms to the volume control standard equals the control time.

11. An electronic device capable of automatically adjusting an output volume, comprising:

an audio player, used for outputting sound; and a processing unit, electrically connected to the audio player, comprising:

a detection module, used for detecting an output volume currently output by the audio player producing sound:

a timer module, signally connected to the detection module, for determining whether the output volume conforms to a volume control standard and calculating a cumulative time of the audio player producing an output volume conforming to the volume control standard when it is determined that the output volume conforms to the volume control standard; and a control module, signally connected to the timer module, for determining whether the cumulative time equals a control time and for controlling the audio player to decrease the output volume of the output sound or to stop outputting sound when it is determined that the cumulative time equals the control time, wherein the processing unit further comprises a reset module, which is signally connected to the timer module and used for receiving a reset command and for resetting the cumulative time of an output volume that conforms to the volume control standard to zero according to the reset command.

12. The electronic device as claimed in claim 8, wherein the control module is used for controlling the audio player to stop outputting sound when it is determined that the cumulative time of the audio player producing an output volume that conforms to the volume control standard equals the control time.

13. The electronic device as claimed in claim 9, wherein the control module is used for controlling the audio player to stop outputting sound when it is determined that the cumulative time of the audio player producing an output volume that conforms to the volume control standard equals the control time.

14. The electronic device as claimed in claim 11, wherein the control module is used for controlling the audio player to stop outputting sound when it is determined that the cumulative time of the audio player producing an output volume that conforms to the volume control standard equals the control time.

* * * * *